United States Patent [19]

Sydansk et al.

[11] 4,287,951

[45] Sep. 8, 1981

[54] PROCESS FOR IMPROVING CONFORMANCE AND FLOW PROFILES IN A SUBTERRANEAN SANDSTONE FORMATION

[75] Inventors: R. D. Sydansk, Littleton, Colo.; P. R. Gucwa, Houston, Tex.

[73] Assignee: Marathon Oil Company, Findlay, Ohio

[21] Appl. No.: 164,619

[22] Filed: Jun. 30, 1980

[51] Int. Cl.$^3$ .................... E21B 33/38; E21B 43/22
[52] U.S. Cl. .................................. 166/281; 166/270; 166/242; 166/300
[58] Field of Search .............. 166/263, 270, 273, 274, 166/281, 292, 300, 305 R; 405/263

[56] References Cited

U.S. PATENT DOCUMENTS

| | | | |
|---|---|---|---|
| 2,156,220 | 4/1939 | Dunn | 166/292 |
| 2,238,930 | 4/1941 | Chamberlain | 166/300 X |
| 2,272,672 | 2/1942 | Kennedy . | |
| 2,402,588 | 6/1946 | Andresen | 166/270 |
| 2,747,670 | 5/1956 | King et al. | 166/270 |
| 2,837,163 | 6/1958 | Ramos et al. | 166/270 X |
| 3,289,759 | 12/1966 | Fisher | 166/270 |
| 3,530,937 | 9/1970 | Bernard | 166/270 |
| 3,658,131 | 4/1972 | Biles | 166/292 |
| 3,805,893 | 4/1974 | Sarem | 166/270 |
| 3,837,400 | 9/1974 | Martin | 166/292 X |
| 3,871,452 | 3/1975 | Sarem | 166/270 |
| 3,938,590 | 2/1976 | Redford et al. | 166/270 |

*Primary Examiner*—Stephen J. Novosad
*Assistant Examiner*—George A. Suchfield
*Attorney, Agent, or Firm*—Jack L. Hummel

[57] ABSTRACT

An aqueous caustic solution and an aqueous solution containing a polyvalent cation dissolved therein are sequentially injected into the near well bore environment of a subterranean sandstone formation interposed by an aqueous spacer. The aqueous caustic solution is caused to reside within the near well bore environment for a period of time sufficient to allow the caustic to interact with the sandstone formation so as to cause a portion of the caustic injected to be held within the near well bore environment. The subsequently injected polyvalent cation and the portion of caustic react within the near well bore environment and form an insoluble precipitate which preferentially reduces the permeability of the relatively highly permeable zones in the near well bore environment thereby improving vertical conformance and flow profiles of fluids subsequently injected into or produced from the formation.

18 Claims, No Drawings

PROCESS FOR IMPROVING CONFORMANCE AND FLOW PROFILES IN A SUBTERRANEAN SANDSTONE FORMATION

TECHNICAL FIELD

The invention relates to a process for improving vertical conformance and flow profiles in subterranean sandstone formations, and more particularly, to a process for improving vertical conformance and flow profiles in the environment near a well bore penetrating a subterranean hydrocarbon-bearing sandstone formation.

BACKGROUND ART

In general, poor vertical conformance of fluids injected into or produced from a subterranean formation occurs where the formation exhibits a lack of vertical homogeneity. For example, while hydrocarbon-bearing subterranean formations exhibit relatively homogeneous horizontal properties near a well bore, horizontal stratification can occur at a distance from the well bore via cross-bedding between subterranean zones, beds, channels or vugs of varying permeabilities. Fluid injected into or produced from a well penetrating the formation tends to preferentially channel or finger into areas of relatively high permeability, thus resulting in extremely poor vertical conformance and flow profiles. Further exemplary, relatively highly permeable zones or beds may be vertically juxtaposed to zones or beds of relatively low permeability at the subterranean location where fluids are to be injected or produced via a well bore, i.e. the near well bore environment. Fluid injected into or produced from the subterranean hydrocarbon-bearing formation will preferentially flow through the zones or beds of relatively high permeability resulting in a relatively high residual hydrocarbon content i. the remaining zones, beds, channels or vugs of relatively low permeability.

Several prior art processes have been proposed to alleviate such preferential channeling or fingering, and thus, improve conformance and injection and/or production flow profiles. High molecular weight organic polymers and cross-linking agents, such as polyvalent cations, have been sequentially injected into a subterranean hydrocarbon-bearing formation. These sequentially injected fluids predominantly finger or channel into areas of relatively high permeability wherein the high molecular weight organic polymers are cross-linked and gelled. This gel plugs relatively highly permeable areas distant from the well bore and improves conformance and flow profiles of injected and/or produced fluids. U.S. Pat. Nos. 3,805,893 and 3,871,452 to Sarem involve processes which utilize the sequential injection of a dilute aqueous alkaline metal silicate solution, such as an aqueous solution of sodium and potassium orthosilicate, a spacer plug of relatively soft water, and an aqueous slug containing a reagent, such as, calcium or magnesium, which will react with the alkaline alkali metal silicate. The orthosilicate and the reagent react at a location distant from the well bore and form a relatively insoluble precipitate. As these injection fluids tend to channel into areas of relatively high permeability, such precipitates tend to plug the highly permeable areas distant from the well bore, and thus, improve conformance and flow profiles. U.S. Pat. No. 3,658,131 to Biles discloses another process for selectively plugging highly permeable channels in a hydrocarbon-bearing formation by injecting a fresh water slug as a spacer for a subsequently injected aqueous solution containing 10-20 weight percent sodium silicate. The silicate will react with calcium cations present in formation water to form a relatively insoluble precipitate. U.S. Pat. No. 3,837,400 to Martin discloses plugging permeable channels in a water flooded oil zone by injecting a sodium hydroxide solution which is isolated from connate water by a slug of water low in metallic ions. At a distance from the well bore, the sodium hydroxide penetrates the water isolation slug and reacts with various metallic ions in the connate water, such as magnesium and calcium, to form low solubility precipitates which will plug the channels. U.S. Pat. No. 2,272,672 to Kennedy relates to a process for minimizing by passing of water encountered in water flooding an oil field. One embodiment of the process involves the successive injection of an alkali and magnesium sulphate or chloride. The alkali and the magnesium sulphate or chloride reacts in situ to form a precipitate which plugs the more permeable strata. U.S. Pat. No. 2,402,588 to Andreson discloses a process for selectively plugging highly permeable strata of a subterranean hydrocarbon-bearing formation by injecting therein an aqueous alkaline solution of sodium silicate and a reagent, such as a weak acid, which slowly reduces the alkalinity of the solution to cause formation of a precipitate or gel. U.S. Pat. No. 3,530,937 to Bernard discloses a process for reducing the permeability of the more highly permeable strata of a subterranean hydrocarbon-bearing formation wherein two aqueous solutions are successively injected into the formation, each solution containing an agent which will react to form a plugging precipitate when brought into contact with each other in the reservoir. An aqueous spacing medium is injected between the two aqueous solutions. Examples of the two solutions are a solution of a water-soluble salt, including calcium and magnesium, and an alkaline solution, such as sodium hydroxide or sodium silicate. Where the formation contains mineral substances capable of reacting with either agent to form a precipitate, care is taken to select an agent which is inert to such mineral substances. U.S. Pat. No. 2,747,670 to King, et al discloses a similar process which involves the sequential injection of an aqueous salt solution, an inert spacing medium, e.g. water on brine, and an aqueous alkali solution into a subterranean formation to improve the permeability profile thereof. Calcium or magnesium salts and sodium hydroxide or sodium carbonate are preferably employed in the successively injected aqueous solutions.

All of these prior art processes involve the use of an aqueous spacer between sequentially injected aqueous fluids. As these fluids preferentially channel or finger into the areas of relatively high permeability, the trailing fluid eventually penetrates the water spacer and reacts with the initially injected fluid or the formation water to form a plugging precipitate at a substantial distance from the well bore. These proposed art processes have not proved altogether satisfactory. The processes which involve the use of high molecular weight polymers or resins tend to be expensive and therefore cost ineffective, and none of these prior art processes have proved effective in improving vertical conformance and flow profiles of injected and/or produced fluids in the environment near a well bore. As radial flow of fluids injected into or produced from a well bore is predominantly influenced by the near well bore environment, failure of the prior art processes to improve vertical conformance and flow profiles in the near well bore environment has resulted in relatively poor vertical conformance and flow profiles of injected and/or produced fluids in the subterranean environment.

As hereinafter detailed, it has been discovered that these prior art processes which employ sequentially injected aqueous fluids fail to improve vertical conformance and flow profiles to any substantial degree due to the lack of mixing, and therefore, formation of precipitates in relatively high permeable areas in the environment near the well bore penetrating the formation. For relatively short radial distances away from the well bore e.g. about 2.5 centimeters to about 9 meters, subterranean formations exhibit relatively homogeneous horizontal characteristics. These prior art processes rely on fingering of sequentially injected aqueous fluids throughout a substantial distance within an area of relatively high permeability to allow the injected fluids to penetrate or disperse through the aqueous spacer slug and mix. As such, sequentially, continuously injected aqueous fluids separated by an aqueous spacer slug do not mix to any substantial degree in relatively highly permeable areas in the near well bore environment, and therefore do not improve conformance and flow profiles of fluids injected into or produced from such environment. Thus, a need exists for a process which results in the formation of large amounts of insoluble, plugging precipitates in relatively highly permeable zones in the near well bore environment to improve vertical conformance and flow profiles of injected or produced fluids.

DISCLOSURE OF INVENTION

The present invention provides a process for improving conformance and injection and production flow profiles in the near well bore environment of a subterranean sandstone formation. A caustic aqueous solution, an inert aqueous spacer, and an aqueous solution containing polyvalent cations are sequentially injected into the near well bore environment. The aqueous caustic solution is permitted to soak within the near well bore environment for a period of time sufficient for the caustic to interact with the sandstone formation so as to cause a portion of the caustic injected to be held within the near well bore environment. The subsequently injected polyvalent cations react with a portion of the caustic retained within the relatively highly permeable areas of the near well bore environment and an insoluble precipitate is formed which predominantly and preferentially reduces the permeability of the relatively highly permeable areas. Zone isolation can be employed to selectively reduce the permeability of a highly permeable subterranean zone within the near well bore environment. The process can also be practised without zone isolation.

BEST MODE FOR CARRYING OUT THE INVENTION

The present invention relates to a process for improving the vertical conformance and flow profiles of fluid injected into or produced from the near well bore environment of a subterranean hydrocarbon-bearing sandstone formation. As utilized throughout this description, the term "near well bore" denotes the area of a subterranean formation surrounding a well bore penetrating the same which exhibits relatively homogeneous horizontal characteristics and wherein mixing between sequentially injected fluids separated by an aqueous spacer will not readily occur to any substantial degree. Such mixing is dependent upon, inter alia, the volume of the aqueous spacer, the characteristics of the formation (e.g. the number of pore channels present in the formation, the permeability of the formation, the degree of homogeneity of the formation, and the geometry of the pores and the pore throats of the formation), the characteristics of each injected fluid (e.g. the diffusion characteristics of each fluid, the viscosities of each fluid, the concentrations of reactive species in each fluid, and the relative mobilities of each injected fluid), and the injection rates of each injected fluid. Given such dependency, the degree of mixing which will occur at a desired distance from a well bore penetrating a formation can be determined by the skilled artisan. As a general guide, the near well bore environment usually extends a radial distance into the formation of up to about 10 feet from the well bore, and may extend up to about 30 feet or more.

The process of the present invention comprises the sequential injection of two aqueous solutions interposed by an aqueous spacer, each of the aqueous solutions containing separate dissolved species which will react upon mixing to produce a voluminous relatively insoluble precipitate. More specifically, the process of the present invention involves the sequential injection of a first caustic, aqueous solution which is permitted to soak within the portion of the near well bore environment treated, an aqueous spacer, and a second aqueous solution containing a dissolved polyvalent cation.

It has been unexpectedly discovered that by allowing the first caustic, aqueous solution to soak within the near well bore environment of a subterranean sandstone formation, the caustic reacts with the sandstone and a substantial portion of the injected caustic is chromatographically held within the near well bore environment. The subsequently injected aqueous solution containing polyvalent cations dissolved therein reacts with the caustic held up in the near well bore environment, resulting in the formation of a precipitate in accordance with the following general reaction, wherein M represents the polyvalent cation:

$$M^{n+} + nOH^- \rightarrow M(OH)_n \tag{1}$$

The resultant precipitate is a highly hydrated and dispersed gel-like compound through which fluid flow is not completely prevented, but is greatly reduced. This precipitate is preferentially formed in, and hence, reduces permeability in the zones of relatively high permeability present in the near well bore environment of the sandstone formation resulting in improved conformance and flow profiles for fluid injected into or produced from the near well bore environment. While it is not completely understood exactly why allowing the injected caustic solution of the present invention to soak results in chromatographic hold up of the caustic in the near well bore environment, it is believed that the caustic attacks the sandstone and partially dissolves clay and certain silica minerals present in the sandstone. A silicate precipitate rich in hydroxide groups is formed and partitions to the liquid-rock interface where flow of subsequently injected fluids is not blocked. A substantial portion of the hydroxide ions consumed in forming the silicate precipitate is released during the subsequent injection of the relatively neutral, aqueous solution containing polyvalent ions. Once released, the hydroxyl ions react with polyvalent cations in accordance with general reaction (1) to form a voluminous precipitate.

The caustic utilized in one of the aqueous solutions may be any hydroxide ion generating compound such as, sodium hydroxide, potassium hydroxide, lithium hydroxide or ammonium hydroxide, although sodium hydroxide is preferred for purposes of the present invention. The aqueous spacer employed in the present invention may be any soft water or brine which is compatible with the formation. As utilized herein, the term "soft" denotes the absence of any deleterious quantity of polyvalent cations. Any polyvalent cation which can be dissolved in an aqueous solution, for example, calcium or magnesium, may be employed in the other aqueous solution. The polyvalent cation can be incorporated into the solution as a salt, such as, for example, magnesium chloride.

The relative amount of caustic and polyvalent cation employed is dictated by the stoichiometry of general reaction (1). Either the polyvalent cation or caustic can be limiting reactant, although for purposes of the present invention it is preferred to utilize caustic as the limiting reactant, and hence, employ a stoichiometric excess of polyvalent cations. The concentration of caustic employed in an aqueous solution is determined by the amount of caustic-sandstone interaction desired, i.e., the amount of caustic needed within the near well bore environment to form the amount of precipitate desired upon reacting with polyvalent cations, and can vary from small concentrations, e.g. 0.1 wt.%, up to saturation level within the solution. It is important to note that caustic can be consumed in peripheral reactions in situ depending upon the mineralogy and lithology of the sandstone formation. For example, any dissolved polyvalent cations, such as, calcium, or minerals, such as, gypsum, anhydrite, and siderite, will neutralize caustic, and thus, impede caustic-sandstone interaction. Thus, the caustic concentration must be sufficient to neutralize such deleterious cations and/or minerals present in the sandstone formation and to form the amount of precipitate desired. A soft aqueous or brine preflush can be injected into the sandstone formation to displace deleterious cations from the near well bore environment prior to caustic injection. Preferably, concentration of polyvalent cation employed in the other aqueous solution is at least the stoichiometric amount required to completely react with the caustic released in the near well bore environment upon injection of the other aqueous solution, with a stoichiometric excess preferably being employed.

In accordance with the present invention, it is critical that the aqueous caustic solution is injected into the reservoir prior to the aqueous spacer slug and the aqueous slug containing polyvalent cations and allowed to soak. The volume of the caustic injected into the near well bore environment is dictated by the depth of treatment desired. Once the depth is determined, the volume of the caustic solution injected is approximately equal to or greater than the pore volume of the portion of the near well bore environment to be treated minus the volume of the residual oil in place. The volume of the caustic solution injected is critical since the injected volume dictates the depth of plugging and thus reduction of fluid flow achieved thereby. The volume of aqueous spacer injected is not critical, although preferably, the volume of aqueous spacer injected should be as small as practical. The lower limit is dictated by that volume necessary to prevent the subsequently injected aqueous solution containing polyvalent cations from mixing with the aqueous caustic solution in the well bore resulting in premature precipitation. The volume of spacer utilized can range up to about five times the volume of aqueous solution injected without substantially affecting the process of the present invention.

The extent of interaction between the injected caustic and the formation sandstone is dependent upon, inter alia, the sandstone mineralogy and lithology, and the surface area of the sandstone, the formation temperature, the caustic concentration injected, and the residence time of the injected caustic within the portion of the near well bore environment treated. Although any subterranean sandstone formation can be treated by the process of the present invention, it is preferred to treat a sandstone formation having a temperature of at least 50° C. and more preferably of at least 75° C. It is critical to the process of the present invention that the injected caustic is allowed to soak within the portion of the near well bore environment treated. The exact residence time of the injected caustic within the formation may vary widely from a few hours, e.g. 2 or 3, to up to 5 days, or more depending on the sandstone formation temperature, mineralogy and lithology. However, a soak period of about 16 to about 24 hours is usually sufficient at formation temperatures in excess of about 75° C.

By utilizing the process of the present invention, the permeability of the near well bore environment of a subterranean hydrocarbon-bearing sandstone formation can be predictably reduced over a relatively wide permeability range, preferably utilizing caustic as the limiting reactant. The process of the present invention is preferentially employed to improve vertical conformance and flow profiles in the near well bore environment of a subterranean hydrocarbon-bearing sandstone formation utilizing mechanical zone isolation, i.e. isolating selected relatively highly permeable zone(s) in a formation utilizing conventional packer assemblies and selectively treating these highly permeable zones. The following examples are illustrative of the application of the process of the present invention with zone isolation and are not to be construed as limiting the scope thereof.

EXAMPLE 1

A 7.6 cm×2.5 cm diameter linear, unfired, homogeneous Berea sandstone plug having an initial permeability of 460 md is sequentially injected with a 3 wt.% NaCl solution, a caustic solution, a water spacer, a polyvalent cation solution and finally a 3 wt.% NaCl solution. The injected fluids and the plug are maintained at 85° C., by a heat exchanger. The fluid permeability of the plug after this sequential injection treatment is measured and compared with the initial permeability. No caustic soak period is utilized. The results are set forth in Table 1.

TABLE 1

| Fluid | Pore Volumes Injected | Permeability (k) (md) | $k_{final}/k_{initial}$ |
|---|---|---|---|
| 3.0 wt. % NaCl | | 460 | |
| 4.0 wt. % NaOH in 3.0 wt. % NaCl | 0.33 | | |
| 3.0 wt. % NaCl | 0.25 | | |
| 2.0 wt. % CaCl$_2$ in 3.0 wt.% NaCl | 0.25 | | |

TABLE 1-continued

| Fluid | Pore Volumes Injected | Permeability (k) (md) | $k_{final}/k_{initial}$ |
|---|---|---|---|
| 3.0 wt. % NaCl | | 440 | 0.96 |
| Second Sequence | | | |
| 4.0 wt. % NaOH in | | | |
| 3.0 wt. % NaCl | 0.33 | | |
| 3.0 wt. % NaCl | 0.17 | | |
| 2.0 wt. % CaCl₂ in | | | |
| 3.0 wt. % NaCl | 0.25 | | |
| 3.0 wt. % NaCl | | 480 | 1.09 |

The permeability reduction achieved by this treatment is not large enough ($k_{final}/k_{initial}=0.96$) to significantly improve vertical conformance and flow profiles of injected or produced fluids. As indicated in Table 1, the same plug is injected with a second sequence of caustic solution, aqueous spacer and polyvalent cation solution in an attempt to further reduce the permeability of the plug. Again, this injection sequence is employed without a caustic soak period. The second sequence actually increases the permeability of the plug. This example illustrates the failure of processes utilizing an aqueous spacer slug between an aqueous solution containing caustic and an aqueous solution containing a species reactive therewith to reduce the permeability of relatively highly permeable zones in the environment near a well bore. The caustic residence time within the near well environment of such processes is not appreciable enough to permit significant interaction with formation sandstone.

EXAMPLE 2

A 7.6 cm × 2.5 cm diameter linear, unfired, homogeneous Berea sandstone plug having an initial permeability of 660 md is sequentially injected with a 30 wt.% NaOH solution, a 0.30 pore volume brine spacer (3 wt.% NaCl solution), and a 10 wt.% MgCl₂ solution. The injected fluids and the plug are maintained at 85° C. by a heat exchanger. The residence time of the NaOH solution within the plug is approximately 16 hours. The aqueous permeability of the plug after treatment is measured and is compared with the initial aqueous mobility ($k_{final}/k_{initial}$). The aqueous permeability is reduced to $k_{final}/k_{initial}=0.036$.

EXAMPLE 3

A 2.5 cm × .2.5 cm diameter, homogeneous sandstone plug from an Oligocene aged reservoir having a residual oil saturation and an initial permeability of 178 md is sequentially injected with a 15 wt.% NaOH in 3 wt.% NaCl solution, a 0.70 pore volume brine spacer (a 3 wt.% NaCl solution), and a 3 wt.% MgCl₂ in 3 wt.% NaCl solution. The injected fluids and plug are maintained at 85° C. by a heat exchanger. The residence time of the NaOH solution within the plug is approximately 16 hours. The fluid permeability of the plug after treatment is measured and compared with the initial permeability ($k_{final}/k_{initial}$). The fluid permeability is reduced to $k_{final}/k_{initial}=0.068$.

EXAMPLE 4

A 2.5 cm × 2.5 cm diameter, homogeneous sandstone plug from an Oligocene aged reservoir having a residual oil saturation and an initial gas permeability of 24 md is sequentially injected at approximately 77 ft./day with a 15 wt.% NaOH in 3 wt.% NaCl solution, a 0.70 pore volume brine spacer (a 3 wt.% NaCl solution), and a 3 wt.% MgCl₂ in 3 wt.% NaCl solution. The injected fluids and plug are maintained at 85° C. by a heat exchanger. The residence time of the NaOH solution within the plug is approximately 16 hours. The aqueous permeability of the plug after treatment is measured and compared with the initial aqueous permeability ($k_{final}/k_{initial}$). The aqueous permeability is reduced to $k_{final}/k_{initial}=0.077$.

As indicated in Examples 2, 3 and 4, allowing the initially injected caustic solution to reside within the formation for an appreciable time period prior to injecting the aqueous spacer and polyvalent cation containing solution unexpectedly results in the formation of insoluble precipitates in zones of relatively high permeability in the near well bore environment. These precipitates substantially improve vertical conformance and flow profiles of fluids injected into or produced from the near well bore environment.

The aforedescribed examples indicate that the process of the present invention can be employed to achieve permeability reduction in relatively highly permeable zone(s) in the near well bore environment utilizing mechanical zone isolation. The process of the present invention can also be applied without zone isolation to preferentially and predominantly reduce permeability and aqueous mobility in relatively highly permeable subterranean zones which are vertically juxtaposed to zones of relatively low permeability in the near well bore environment. The following example is illustrative of the application of the process of the present invention without zone isolation, and is not to be construed as limiting the scope thereof.

EXAMPLE 5

Sequential injections are conducted in parallel utilizing 2.5 cm × 2.5 cm diameter linear homogeneous sandstone plugs from an Oligocene aged reservoir, one plug having a relatively high permeability, the other a relatively low permeability. The plugs are sequentially injected with a synthetic water flood injection brine, a 3 wt.% NaCl solution, a 0.72 pore volume 20 wt.% NaOH in 3 wt.% NaCl solution, a 0.64 pore volume brine spacer (a 3 wt.% NaCl solution), 3 wt.% MgCl₂ in a 3 wt.% NaCl solution, and a synthetic water flood injection brine. The injected fluids and both plugs are maintained at 85° C. by heat exchangers. The synthetic water flood injection brine had a constituency concentration of 18,600 ppm NaCl, 3,820 ppm MgCl₂, 3,070 ppm Na₂SO₄ and 875 ppm CaCl₂. The residence time of the NaOH solution within the plug is approximately 24 hours. The fluid permeability of each plug is measured after the sequential injection and at selected intervals up to 3 days thereafter. These subsequent measurements account for any settling of the precipitate which occurs after the formation thereof. The results of the sequential injections are set forth in Table 2.

TABLE 2

| Fluid | Plug (Permeability) | Pore Volumes Injected | Final Mobility (md/cp) | Final Permeability (k) (md) | $k_{final}/k_{initial}$ | $k_{high}/k_{low}$ |
|---|---|---|---|---|---|---|
| Syn. Injection | High | 10.0 | 74.4 | 26.5 | 1.00 | 12.9 |
| Brine | Low | 10.0 | 5.75 | 2.05 | 1.00 | |
| 3 wt. % NaCl | High | 5.0 | 78.3 | 27.9 | 1.05 | 13.3 |
| | Low | 5.0 | 5.89 | 2.10 | 1.02 | |
| 15 wt. % NaOH 3 wt. % NaCl | High & Low | 0.72 | 22. | | | |
| 3 wt. % NaCl | High | 1.0 cc | 32. | | | |
| | Low | 2.0 cc | 2.7 | | | |
| 3 wt. % MgCl$_2$ 3 wt. % NaCl | High & Low | 3.0 | 3.4 | | | |
| Syn. Injection Brine | High & Low | 10.0 | 4.1 | 1.5 | | |
| | High | 10.0 | 7.31 | 2.61 | .098 | 3.8 |
| | Low | 15.0 | 1.93 | 0.689 | .34 | |
| Shut-in 24 Hrs. | High | 10.0 | 6.11 | 2.18 | .083 | 2.0 |
| | Low | 10.0 | 3.11 | 1.11 | .54 | |
| Shut-in 24 Hrs. | High | 10.0 | 7.12 | 2.54 | .095 | 2.1 |
| | Low | 10.0 | 3.40 | 1.21 | .59 | |
| Shut-in 72 Hrs. | High | 10.0 | 7.88 | 2.81 | .11 | 2.2 |
| | Low | 10.0 | 3.60 | 1.29 | .62 | |

As these results indicate, the ratio ($k_{high}/k_{low}$) of the permeability at residual crude saturation of the high permeability plug (26.5) to the permeability of the low permeability plug (2.05) before treatment was 12.9 while after treatment in accordance with the present invention was unexpectedly 2.2. Thus, it can be appreciated that the permeability of the relatively high permeability plug was preferentially and predominantly reduced by application of the process of the present invention. As such, the ratio of the permeability of the high permeability plug to the low permeability plug was significantly reduced, thus, improving the vertical conformance and flow profiles of subsequently injected and produced fluids.

It is important to note that the permeability reduction effects of the process of the present invention can be reversed by the application of a mineral acid, such as, hydrochloric acid. Ammonium chloride which is inexpensive and readily available can also be employed in solution to dissolve the precipitate.

Repeated applications of the sequential injection of the present invention will further reduce the permeability of relatively highly permeable areas or zones and thus the aqueous mobility therethrough. The process of the present invention is most advantageously applied to subterranean sandstone formations having a relatively high clay content or a relatively large amount of silica minerals having high surface area.

Although the present invention has been described as a process for treating and improving vertical conformance and flow profiles in the near well bore environment of a subterranean sandstone formation, the process of the present invention also improves vertical conformance and profiles of fluids injected into and produced from the distant well bore environment. As will be evident to the skilled artisan, vertical conformance and flow profiles for injected or produced fluids will be improved to the greatest extent in distant well bore environment of a subterranean sandstone formation by application of the present invention in the near well bore environment where vertical fluid communication between zones of varying permeability in the distant well bore environment is limited.

While the foregoing preferred embodiment of the invention has been described and shown, it is understood that all alternatives and modifications, such as those suggested, and others may be made thereto, and fall within the scope of the invention.

What is claimed is:

1. A process for improving vertical conformance and flow profiles of fluids injected into or produced from a subterranean sandstone formation having at least one zone of relatively high permeability and at least one zone of relatively low permeability, the formation being penetrated by a well bore in fluid communication therewith and having a near well bore environment which exhibits relatively homogeneous horizontal properties, the process comprising:

injecting into said near well bore environment via said well bore a caustic aqueous solution, having caustic dissolved therein;

shutting in said well bore for a period of time sufficient to allow said caustic to interact with said sandstone formation thereby resulting in at least a portion of said caustic being held within said near well bore environment;

injecting into said near well bore environment an aqueous spacer slug; and thereafter, injecting into said near well bore environment via said well bore a polyvalent cation containing solution having a polyvalent cation dissolved therein that is reactive with said caustic, permitting said polyvalent cation to react with said at least a portion of said caustic to form an insoluble precipitate preferentially and predominantly within said at least one zone of relatively high permeability in said near well bore environment of the formation, said precipitate predominantly and preferentially reducing the permeability of said at least one zone of relatively high permeability.

2. The process of claim 1 wherein said caustic is sodium hydroxide.

3. The process of claim 2 wherein said polyvalent cation is magnesium.

4. The process of claim 3 wherein said caustic is sodium hydroxide.

5. The process of claim 1 wherein the volume of said caustic solution which is injected into said near well bore environment is about equal to the pore volume of said near well bore environment minus the volume of the residual oil contained in said near well bore environment.

6. The process of claim 1 wherein said subterranean formation is a subterranean hydrocarbon-bearing formation.

7. The process of claim 1 wherein said aqueous spacer slug is soft water.

8. The process of claim 1 wherein the volume of said aqueous spacer slug which is injected into said near well bore environment is sufficient to prevent formation of said precipitate within said well bore.

9. The process of claim 1 wherein said period of time is at least 16 hours.

10. A process for improving vertical conformance and flow profiles of fluids injected into or produced from a subterranean sandstone formation having a zone of relatively high permeability and a vertically juxtaposed zone of relatively low permeability, the sandstone formation being penetrated by a well bore in fluid communication therewith and having a near well bore environment which exhibits relatively homogeneous horizontal properties, the process comprising:
injecting via said well bore into said zone of relatively high permeability in said near well bore environment a caustic aqueous solution having caustic dissolved therein;
shutting in said well bore for a period of time sufficient to allow said caustic to interact with said sandstone formation thereby resulting in at least a portion of said caustic being held within said near well bore environment; injecting via said well bore into said zone of relatively high permeability in said near well bore environment an aqueous spacer slug; and, thereafter
injecting via said well bore into said zone of relatively high permeability in said near well bore environment a polyvalent cation containing solution having a polyvalent cation dissolved therein that is reactive with said caustic, permitting said polyvalent cation solution to react with said at least a portion of said caustic to form an insoluble precipitate within said zone of relatively high permeability in said near well bore environment, said insoluble precipitate reducing the permeability of said zone of relatively high permeability in said near well bore environment and reducing the ratio of the permeability of said zone of relatively high permeability to the permeability of said zone of relatively low permeability.

11. The process of claim 10 wherein said caustic is sodium hydroxide.

12. The process of claim 11 wherein said polyvalent cation is magnesium and said insoluble precipitate is magnesium hydroxide.

13. The process of claim 12 wherein said caustic is sodium hydroxide.

14. The process of claim 10 wherein the volume of said caustic aqueous solution which is injected into said zone of relatively high permeability in said near well bore environment is about equal to the pore volume of said zone of relatively high permeability in said near well bore environment minus the volume of residual oil contained in said zone of relatively high permeability in said near well bore environment.

15. The process of claim 10 wherein said aqueous spacer slug is soft water.

16. The process of claim 10 wherein said subterranean formation is a subterranean hydrocarbon-bearing formation.

17. The process of claim 10 wherein the volume of said aqueous spacer slug which is injected into said near well bore environment is sufficient to prevent formation of said precipitate within said well bore.

18. The process of claim 10 wherein said period of time is about 16 to about 24 hours.

* * * * *

UNITED STATES PATENT AND TRADEMARK OFFICE
CERTIFICATE OF CORRECTION

PATENT NO. : 4,287,951
DATED : September 8, 1981
INVENTOR(S) : R. D. Sydansk, P. R. Gucwa It is certified that error appears in the above-identified patent and that said Letters Patent are hereby corrected as shown below:

Col. 7, line 54: Delete ".2.5" and insert --2.5--.
Col. 9, Table 2, heading: Delete "$k_{final} \quad k_{high}$ and insert $k_{initial} \quad k_{low}$"

--$\dfrac{k_{final}}{k_{initial}} \quad \dfrac{k_{high}}{k_{low}}$--.

Signed and Sealed this

Eighth Day of December 1981

[SEAL]

Attest:

GERALD J. MOSSINGHOFF

*Attesting Officer*     *Commissioner of Patents and Trademarks*